(12) United States Patent
Naveh (10) Patent No.: US 10,008,016 B2
(45) Date of Patent: Jun. 26, 2018

(54) PROXIMITY-BASED IMAGE RENDERING

(75) Inventor: Barak R. Naveh, Palo Alto, CA (US)

(73) Assignee: FACEBOOK, INC., Menlo Park, CA (US)

( * ) Notice: Subject to any disclaimer, the term of this patent is extended or adjusted under 35 U.S.C. 154(b) by 153 days.

(21) Appl. No.: 13/603,839

(22) Filed: Sep. 5, 2012

(65) Prior Publication Data

US 2014/0062852 A1    Mar. 6, 2014

(51) Int. Cl.
| | |
|---|---|
| *G06F 3/033* | (2013.01) |
| *G06T 11/60* | (2006.01) |
| *G06F 3/03* | (2006.01) |
| *G06F 3/0484* | (2013.01) |

(52) U.S. Cl.
CPC ............ *G06T 11/60* (2013.01); *G06F 3/0304* (2013.01); *G06F 3/0484* (2013.01); *G06F 2203/04806* (2013.01); *G09G 2340/045* (2013.01)

(58) Field of Classification Search
CPC ... G09G 2354/00; G09G 5/00; G09G 2320/00
USPC ......................................................... 345/156
See application file for complete search history.

(56) References Cited

U.S. PATENT DOCUMENTS

| | | | | |
|---|---|---|---|---|
| 6,167,166 A | * | 12/2000 | Loce ...................... | G06K 15/02 382/266 |
| 7,203,911 B2 | * | 4/2007 | Williams ...................... | 715/864 |
| 8,004,502 B2 | * | 8/2011 | Keam ...................... | 345/175 |
| 8,576,161 B2 | * | 11/2013 | Chang et al. ................. | 345/104 |
| 2003/0234799 A1 | * | 12/2003 | Lee ................................ | 345/660 |
| 2008/0049020 A1 | * | 2/2008 | Gusler .................... | G06F 3/012 345/427 |
| 2008/0055318 A1 | * | 3/2008 | Glen ........................ | G09G 3/20 345/501 |
| 2008/0088648 A1 | * | 4/2008 | Nathan et al. ................. | 345/690 |
| 2008/0316372 A1 | * | 12/2008 | Xu et al. ........................ | 348/739 |
| 2009/0079765 A1 | * | 3/2009 | Hoover .......................... | 345/660 |
| 2010/0250766 A1 | * | 9/2010 | Riggert .......... | H04N 21/234318 709/231 |
| 2011/0148930 A1 | * | 6/2011 | Lee et al. ...................... | 345/660 |

* cited by examiner

*Primary Examiner* — Towfiq Elahi
(74) *Attorney, Agent, or Firm* — Keller Jolley Preece (57) ABSTRACT

In one embodiment, a method includes adjusting the images or text rendered on a display based on the position of the viewers relative to the display.

16 Claims, 6 Drawing Sheets

FIG. 8

PROXIMITY-BASED IMAGE RENDERING

TECHNICAL FIELD

This disclosure relates generally to image-display devices.

BACKGROUND

Image-display devices have been implemented in many forms: televisions, computer screens, mobile-device screens, teleconference devices, electronic billboards and other advertisement displays, and electronic screens that are embedded in various other electronic devices. As image-display technology has evolved, digital screens have been incorporated into more and more devices both large and small, for example, home appliances, watches, elevators, and vehicles such as automobiles and airplanes.

SUMMARY

Particular embodiments adjust an image rendered on a display based the location of a viewer relative to the display. In addition or as an alternative, the image may be adjusted based on the locations of multiple viewers relative to the display or each other. The display may be a television screen, a computer screen, mobile-device screen, teleconference-device screen, an advertising display, or any other suitable display.

In particular embodiments, display adjustment involves changing the size of an image or text rendered on the display. In addition or as an alternative, display adjustment may involve changing the quantity of images or text rendered on the display. In addition or as an alternative, display adjustment may involve changing the level of detail in images or text rendered on the display. In addition or as an alternative, display adjustment may involve changing the frame rate for rendering images or text on the display.

Particular embodiments may determine the location of a viewer relative to a display through the use of a camera (which may be a component of the device with the display). In addition or as an alternative, the location of the viewer relative to the display may be determined through the use of proximity sensors.

DESCRIPTION OF EXAMPLE EMBODIMENTS

A viewer of a display may not always be positioned at an appropriate viewing distance from the display while viewing images and text on the screen. Or the viewer may change his or her position relative to the display during the viewing of the screen. As the proximity of the viewer to the screen changes, it would be helpful for the viewer if the display adjusted the images or text rendered on the screen. For example, a viewer that is very far away from a screen may find it difficult to read text rendered in a very small font. Likewise, a viewer that is very close to the screen may find it difficult to read text rendered in a very large font. An image display device that adjusts the rendering of images and text on the screen to take into account the position of viewer would provide the viewer with a better overall viewing experience.

Figure 1:
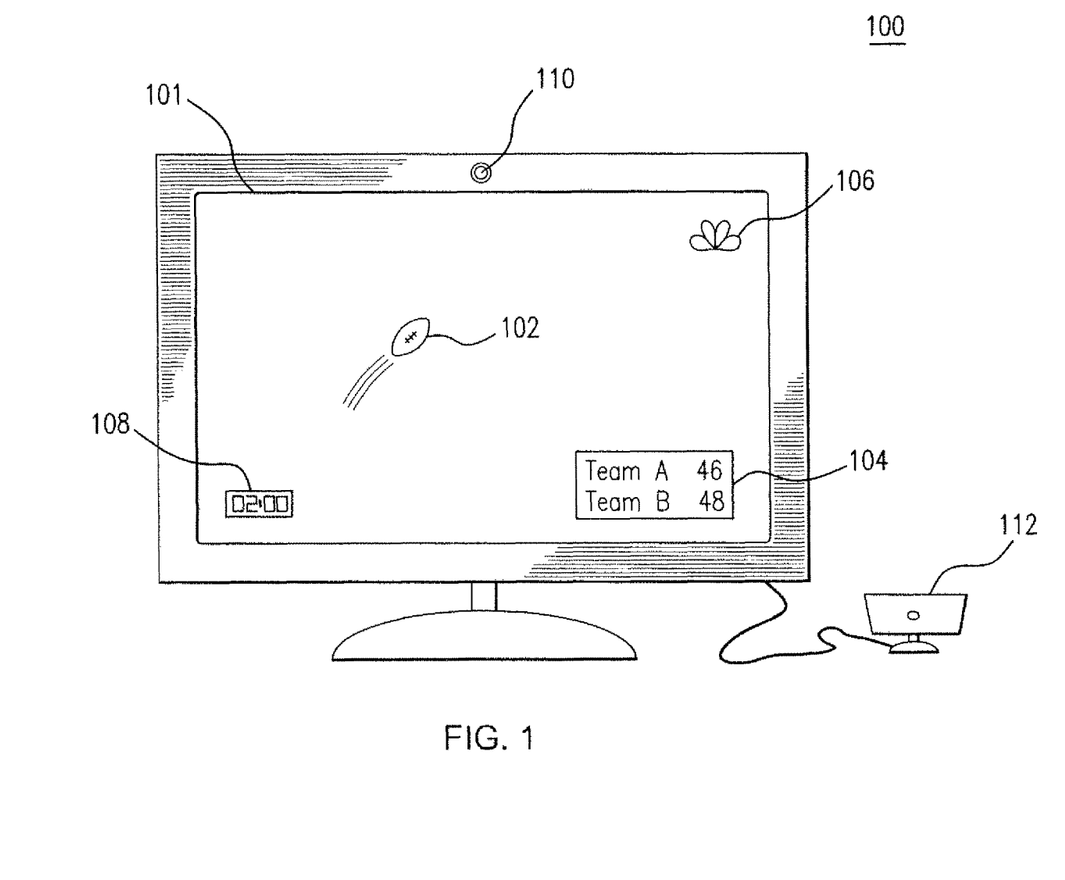
FIG. 1 illustrates an example display of images and text not adjusted based on a location of a viewer relative to the display.

FIG. 1 illustrates a television display 100 that has both images and text rendered on screen 101. In alternate embodiments, the display may be a computer screen, mobile device screen, teleconference screen, electronic billboard, advertisement display, or an electronic screen that is embedded in various other devices, such as an appliance, a watch, an elevator, or a vehicle. When the viewer is positioned at a normal distance from screen 101, image 102 and text 104 will all be discernable to the viewer. However, as the viewer is positioned farther away from screen 101, the images and text on the screen will appear smaller to the viewer. As a result, it may become difficult for a viewer farther away from screen 101 to clearly discern image 102 and text 104.

Figure 2:
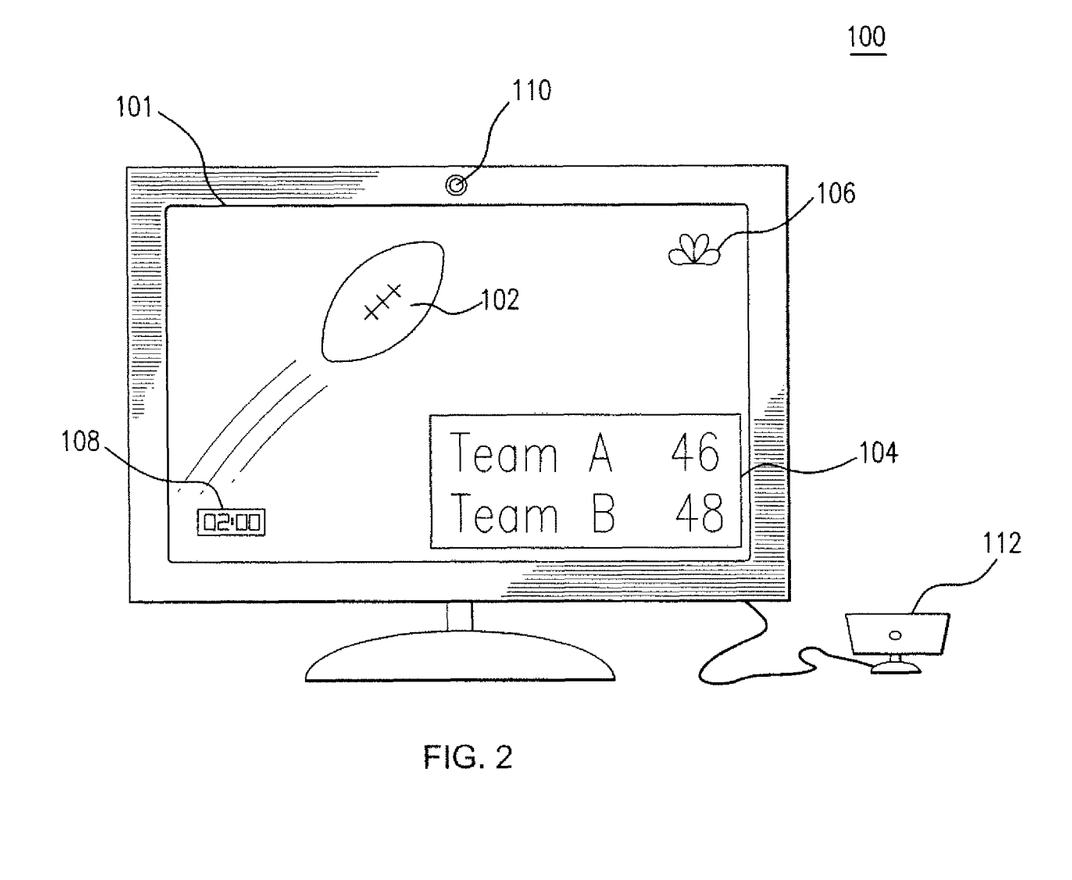
FIG. 2 illustrates an example display of images and text adjusted based on a location of a viewer relative to the display.

FIG. 2 illustrates a television display 100 that has adjusted both the images and text rendered on screen 101 to accommodate a viewer who is positioned farther away from the screen. The display has increased the rendered size of image 102 and text 104 so that a viewer farther away from screen 101 can discern both the image and the text with less difficulty. In alternate embodiments, the display can decrease the rendered size of image 102 or decrease the rendered size of text 104 as a viewer moves closer to screen 101.

In one embodiment, the display can adjust the size of the entire image on screen 101 as the position of the viewer changes. In another embodiment, the display can adjust the size of portions of the image as the position of the viewer changes. In some embodiments, the display can adjust the size of all the displayed text or just portions of the displayed text as the position of the viewer changes.

For example, in an example embodiment the display may be showing a football game on the screen. The video of the football game at any given time could include multiple images and text. Portions of the image displayed on the screen could include the image 102 of a football, or the image 106 of the channel icon. Portions of the text displayed on the screen could include the text 104 of the scoreboard, or the text 108 of the game clock. Referring to FIG. 1, when the viewer is positioned at a normal distance from screen 101, images 102 and 106 and text 104 and 108 will all be discernable to the viewer.

Referring to FIG. 2, as the distance between the viewer and screen 101 increases, the display may change the size of portions of the image and text, but may not change the size of other portions of the image and text. As an example, display 100 may increase the size of image 102 of the football, but not increase the size of image 106 of the channel icon. As another example, display 100 may increase the size of text 104 of the scoreboard, but not increase the size of text 108 of the game clock. Alternatively, the display may also change the quantity of images and text rendered on the screen. As the size of portions of the image and text on the screen increase, there may be less room on the screen to render other portions of the image and text, and therefore the display may choose not to render certain portions of the image and text at all. For example, as the size of other images and text on the screen increase, display 100 may not render image 106 of the channel icon.

Figure 3:
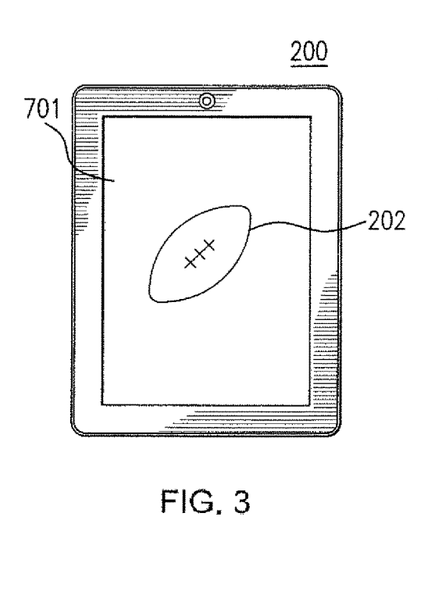
FIG. 3 illustrates an example tablet computer displaying an image not adjusted based on a location of a viewer relative to a display of the tablet computer.

FIG. 3 illustrates a tablet computer 200 that has an image rendered on screen 201. In alternate embodiments, the display may also be a television screen, a computer screen, a laptop screen, a mobile device screen, or an electronic screen that is embedded in various other devices. When the viewer is positioned at normal distance from screen 201, image 202 will be discernable to the viewer. The rendered detail of image 202 can be discerned by the viewer. As the distance between the viewer and screen 201 increases, however, the viewer may not be able to discern all of the rendered detail of image 202. Therefore, the tablet computer can decrease the rendered detail of image 202 without a significant noticeable change to the viewer.

Figure 4:
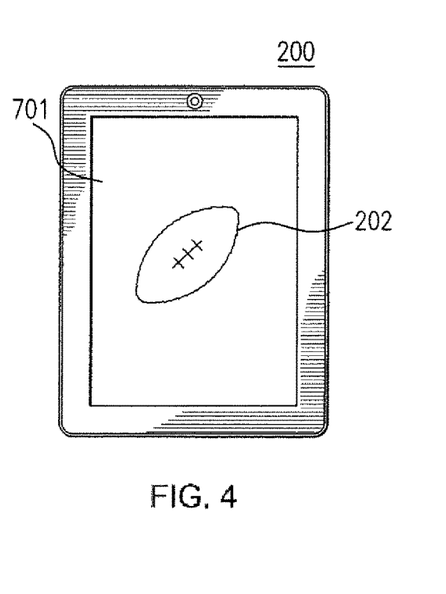
FIG. 4 illustrates an example tablet computer displaying an image adjusted based on a location of a viewer relative to a display of the tablet computer.

FIG. 4 illustrates a tablet computer 200 that has adjusted the image rendered on screen 201 for a viewer that is farther away from the screen. The rendered detail of image 202 has been decreased, resulting in a less detailed image. In one embodiment, the rendered detail of an image can be decreased by decreasing the resolution of the image. Because the viewer is farther away from screen 201, the viewer will not notice the reduced detail of image 202 as much as when the viewer was closer to screen 201. Therefore, the rendered detail of an image or text can be reduced for a user farther away from the screen without substantially affecting the viewing experience of the user.

In alternate embodiments, the display can increase the rendered detail of image or text as a viewer moves closer to the screen. This application will be helpful in situations where a viewer needs to discern more detail in an image, such as a fine photograph or small font text. In one embodiment, the rendered detail of an image can be increased by increasing the resolution of the image. Accordingly, the rendered detail of an image or text can be increased for a user closer to the screen to improve the viewing experience of the user.

In another embodiment, reducing the rendered detail of an image will also reduce the processing time necessary to render the image, which in turn will reduce the power consumption by the display. This will be particularly useful for battery consuming devices, such as computers screens, tablet screens, mobile device screens or electronic screens embedded in various other mobile devices. Reducing the power consumption of the display will help extend the battery time of the mobile device.

In other embodiments, the frame rate of videos rendered on the display can be adjusted in accordance to the proximity of the viewer to the display. In addition to the adjustments in the detail of videos rendered on the screen due to changes in the proximity of the viewer (as discussed above), the display device may also adjust the frame rate for rendering videos on the screen. As an example, videos that are rendered in lesser detail require less image processing time. As a result of the reduction in processing time needed to render the videos, more processing time can be devoted to increasing the frame rate of the videos displayed. As another example, videos that are rendered in greater detail require more image processing time. As a result of the increase in processing time needed to render the videos, the display may decrease the frame rate of the videos displayed.

Figure 5:
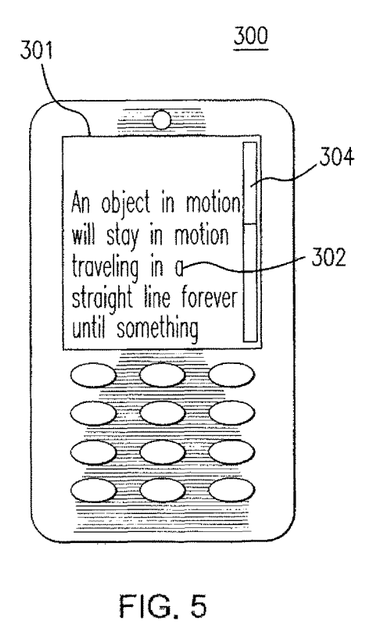
FIG. 5 illustrates an example smartphone displaying text not adjusted based on a location of a viewer relative to a display of the smartphone.

FIG. 5 illustrates a mobile device 300 that has text rendered on screen 301. In alternate embodiments, the mobile device can include cell phones, smart phones, personal data assistants, MP3 players, and any other mobile computer device. When the viewer is positioned at normal distance from screen 301, text 302 will be readable to the viewer. As the distance between the viewer and screen 301 increases, however, the text will appear smaller to the viewer and he or she may not be able to read all of the letters of text 302. Accordingly, the mobile device can decrease the amount of text currently displayed to the viewer and concurrently increase the rendered size of text.

Figure 6:
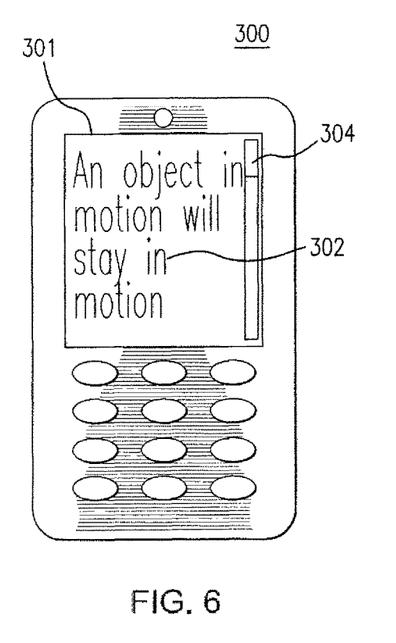
FIG. 6 illustrates an example smartphone displaying text adjusted based on a location of a viewer relative to a display of the smartphone.

FIG. 6 illustrates a mobile device 300 that has adjusted the text rendered on screen 301 for a viewer that is farther away from the screen. The amount of text 302 has been decreased, and the font size of the text has been increase. This will allow the reader to read all of the letters of text 302. The viewer can see the remaining text by using scroll bar 304 at the side of the screen, or a similar user interface that will allow the user to access the remaining text that is not currently displayed. When less text is displayed on the screen, the mobile device can present a simplified, less cluttered display for the viewer. In alternate embodiments, the mobile device can increase the amount of text 302, and decrease the font size of the text as a viewer moves closer to screen 301. In alternative embodiments, the device can decrease the amount of images displayed to the viewer and concurrently increase the rendered size of the images, as described above with respect to text.

Referring to FIG. 1, the position of the viewer relative to the display can be determined through the use of cameras or sensors attached to the display device. In one embodiment one or more cameras could be used to determine the proximity of the viewer to the screen. In another embodiment, one or more sensors could be used to ascertain where the viewer is in proximity to the screen. As an example, an internal device, such as camera 110, could be embedded in television display 100 to determine the proximity of the viewer to screen 101. As another example, an external device, such as a Kinect™ device 112, could be attached to television display 110 to determine the proximity of the viewer to screen 101.

In example embodiments, the viewer may customize the settings of the display device to pre-determine the appropriate rendering size and detail of images or text on the screen. Each viewer may have particular preferences for how he or she would like images and text to be rendered on the screen. The preferences for one or more viewers can be saved on the display device. In one embodiment, the viewer can login or identify himself when he or she turns on the display device. In another embodiment, a face recognition device can be attached to the display device so that it can recognize who the current viewer is and automatically apply the viewer's preferences. For example, a camera attached to the display device could be equipped with face recognition technology. Once the display device has determined who the viewer is, the display settings can be customized to the preferences of the viewer.

In some embodiments, the display device may optimize the size and detail of images or text rendered on the display for multiple users viewing the display concurrently in different positions relative to the display. In one embodiment, the display may have settings that limit how large or small images or text will be rendered on the screen. Or alternatively, the display may have settings for limitations of the rendering detail of images or text on the screen. As an example, if there are multiple viewers of a display, the display may not render text in very small font if the viewer farthest away from the display will not be able to read the text. As another example, if there are multiple viewers of a display, the display may not render images in very low detail if the low resolution image will affect the viewing experience of the viewer closest to the display.

In alternate embodiments, the display may have settings that employ various algorithms on the proximity of multiple viewers from the screen in order to determine the optimal size for rendering images or text. For example, the algorithms could include calculating the mean of median distance of multiple viewers from the screen. In another embodiment, the display may have settings that employ other means to optimize the image rendered on the screen to account for the distance of multiple viewers, such as employing anti-abasing or various other image processing techniques.

In another embodiment, the display could be embedded in a vehicle. The operator of the vehicle may view the display during the operation of the vehicle. The rendering of the image or text on the display can be adjusted according to the travelling conditions of the vehicle. In one embodiment, the size of the images or text rendered on the screen could be increased as the speed of an automobile increases. As the automobile speed increases, the operator may have less time to take his or her eyes off the road in order to view the display. Trying to discern small images or text on a display may require too much time for the operator of a vehicle. Increasing the size of images or text on the display will allow the operator to quickly discern the information necessary from the screen, and return his or her eyes to the road.

In a further embodiment, the display could be positioned outside a vehicle for viewing by an operator or passenger within a vehicle. For example, the display could be embedded in a stationary billboard which is displayed to viewers within passing vehicles. As discussed above, the images and text rendered on screen could be adjusted to accommodate the position of a viewer relative to the screen. The distance between the viewer and the screen will change when the viewer is in a moving vehicle. Therefore, it would be helpful for the viewer to adjust the display of the images and text rendered on the screen, as discussed above, to accommodate the changing position of the viewer in a moving vehicle. Alternatively, the images and text rendered on the screen could be adjusted to accommodate the speed of a viewer in a passing vehicle, in addition to the viewer's distance from the screen. For example, the size of the images or text rendered on the screen could be increased as the speed of a passing automobile increases. This will allow the operator of the vehicle to quickly discern the information on the screen, and return his or her eyes to the road. The location and speed of the viewer in the vehicle can be determined using proximity sensors and cameras embedded in the display and/or in various locations where vehicle movement can be assessed.

Figure 7:
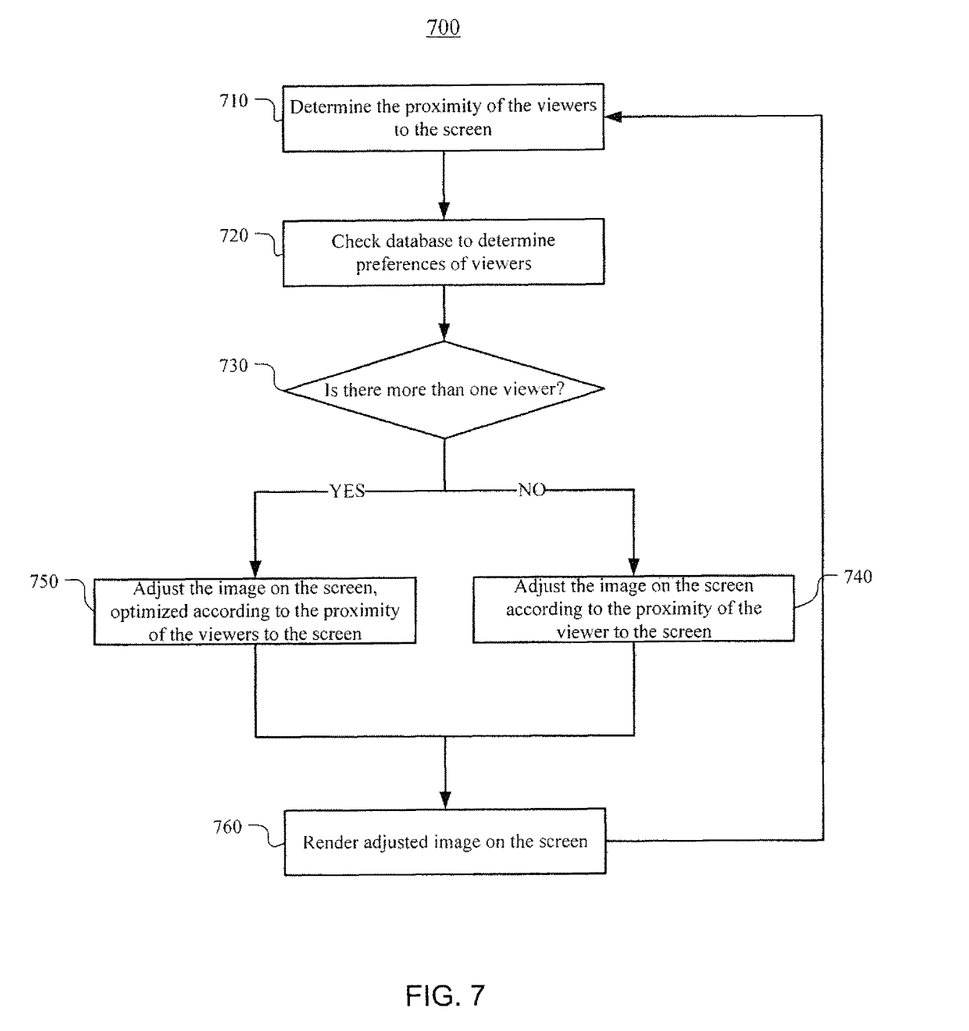
FIG. 7 illustrates an example method for proximity-based image rendering.

FIG. 7 illustrates an example method 700 for proximity-based image rendering. The method may begin at step 710, where the display device determines the proximity of the viewers to the screen. At step 720, the display device checks its database to determine if the viewers have preferences for viewing and adjusting the display of images and text on the screen. For example, the viewers may have preferences for adjusting the size, rendered detail, or frame rate of the images and text rendered on the screen. At step 730, the display device will assess whether there is more than one viewer of the screen. If there is only one viewer, then the display device will proceed to step 740 where based on the preferences of the viewer, the display device will adjust the images and text on the screen according to the proximity of the viewer. If there is more than one viewer, then the display device will instead proceed to step 750 where based on the preferences of the multiple viewers, the display device will optimize the images and text on the screen for viewing by all the viewers. After steps 740 or 750, the display device will proceed to step 760, where it will render the image on the screen, which will have been adjusted based on the proximity of the viewers to the screen. After rendering the image on the screen, the display device will return to step 710 and reassess the proximity of the viewers to the screen, since the locations of the viewers may have changed during the viewing process. Particular embodiments may repeat one or more steps of the method of FIG. 7, where appropriate. Although this disclosure describes or illustrates particular steps of the method of FIG. 7 as occurring in a particular order, this disclosure contemplates any suitable steps of the method of FIG. 7 occurring in any suitable order. Moreover, although this disclosure describes or illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
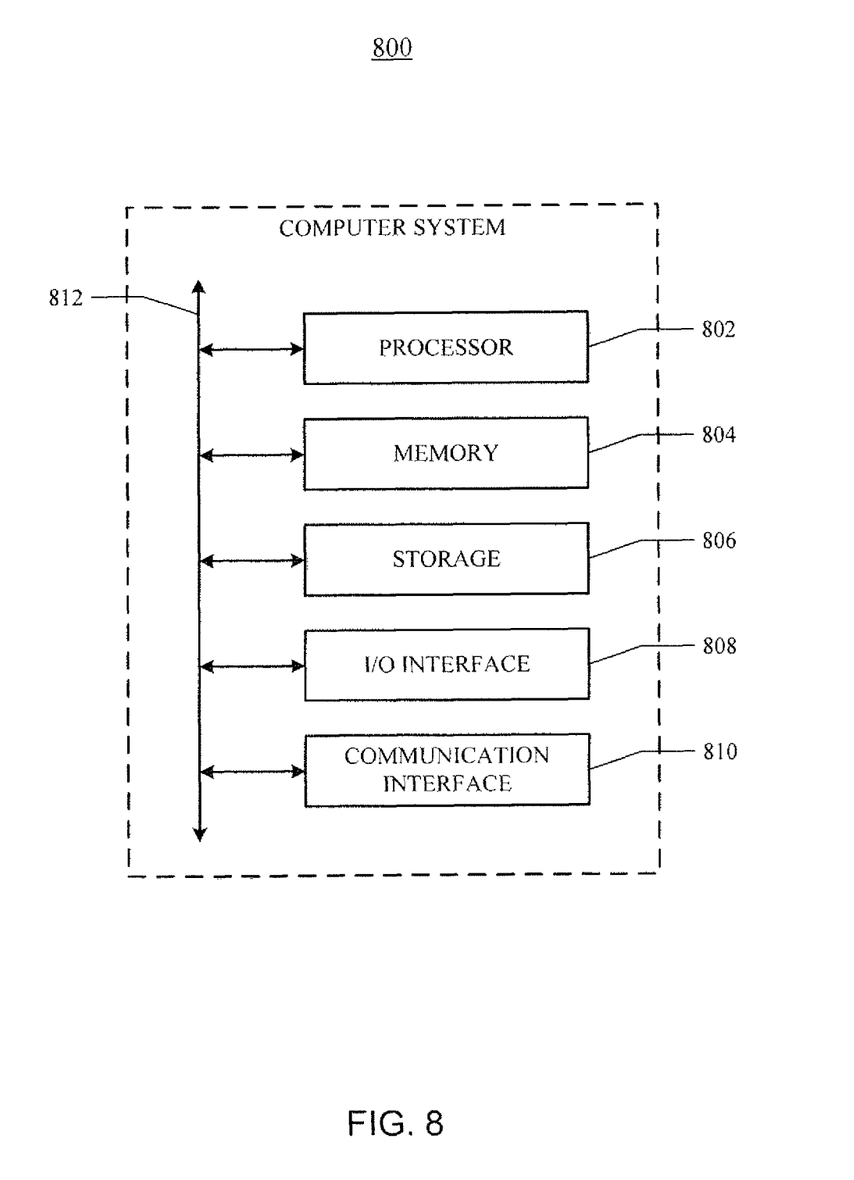
FIG. 8 illustrates an example computer system.

FIG. 8 illustrates an example computer system 800 for the display device. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system (such as, for example, a computer system integrated in a display device), a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 810, a communication interface 812, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. For example, storage 806 may include storage that resides in a cloud in one or more networks. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage. In particular embodiments, storage 806 may also include database storage for information related to the viewers of the display device. For example, storage 806 may include information on the preferences of the viewers, such as information on preferences for adjusting the size, rendered detail, or frame rate of the images and text rendered on the screen.

In particular embodiments, I/O interface 810 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, proximity sensors, another suitable I/O device or a combination of two or more of these. An I/O device may include one or more sensors. This disclosure contemplates any suitable I/O devices and any suitable I/O interfaces 810 for them. Where appropriate, I/O interface 810 may include one or more device or software drivers enabling processor 802 to drive one or more of these I/O devices. I/O interface 810 may include one or more I/O interfaces 810, where appropriate. Although this disclosure describes and illustrates a particular I/O interface, this disclosure contemplates any suitable I/O interface.

In particular embodiments, communication interface 812 includes hardware, software, or both providing one or more interfaces for communication (such as, for example, packet-based communication) between computer system 800 and one or more other computer systems 800 or one or more networks. As an example and not by way of limitation, communication interface 812 may include a network interface controller (NIC) or network adapter for communicating with an Ethernet or other wire-based network or a wireless NIC (WNIC) or wireless adapter for communicating with a wireless network, such as a WI-FT network. This disclosure contemplates any suitable network and any suitable communication interface 812 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 812 for any of these networks, where appropriate. Communication interface 812 may include one or more communication interfaces 812, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for rendering an image on a display, the method comprising:
   determining a proximity for each of a plurality of viewers relative to the display;
   recognizing an identity for each of the plurality of viewers;
   accessing stored preferences associated with each recognized identity in response to recognizing the identity for each of the plurality of viewers;
   determining optimized settings for the image based on the determined proximity for each of the plurality of viewers and the stored preferences of the plurality of viewers; and
   adjusting the rendering of the image on the display by changing a resolution of the rendered detail of the image based on the determined optimized settings.

2. The method of claim 1, wherein the image comprises text.

3. The method of claim 1, wherein adjusting the rendering of the image further comprises changing a size of the image.

4. The method of claim 1, wherein adjusting the rendering of the image further comprises changing a frame rate for displaying the image.

5. The method of claim 1, wherein adjusting the rendering of the image further comprises changing a quantity of images rendered on the display.

6. The method of claim 1, wherein determining the proximity for each of a plurality of viewers relative to the display comprises the use of one or more cameras.

7. The method of claim 1, wherein determining the proximity for each of a plurality of viewers relative to the display comprises the use of one or more proximity sensors.

8. A system comprising:
a display;
a proximity detection device to determine a proximity of each of two or more viewers relative to the display;
memory to store instructions which when executed by a processor cause the processor to:
   recognize an identity for each of the two or more viewers,
   access stored preferences associated with each recognized identity in response to recognizing the identity for each of the two or more viewers,
   determine optimized settings for the image based on the determined proximity for each of the two or more viewers and the stored preferences of the two or more viewers, and
   adjust a rendering of an image by at least changing a resolution of the rendered detail of the image according to the determined optimized settings; and
a processor coupled to the memory to execute the instructions stored in the memory.

9. The system of claim 8, wherein the image comprises text.

10. The system of claim 8, wherein the memory further includes instructions for adjusting the rendering of the image by changing a size of the image.

11. The system of claim 8, wherein the memory further includes instructions for adjusting the rendering of the image further by changing the frame rate for displaying the image.

12. The system of claim 8, wherein the memory further includes instructions for adjusting the rendering of the image further by changing the quantity of images rendered on the display.

13. The system of claim 8, wherein the memory further includes instructions for adjusting the rendering of the image further by optimizing the display of the image for more than one viewer.

14. The system of claim 8, wherein the proximity detection device is a camera.

15. A method comprising:
determining a proximity for each of a plurality of viewers relative to a display;
recognizing an identity for each of the plurality of viewers;
accessing stored preferences associated with each recognized identity in response to recognizing the identity for each of the plurality of viewers;
determining optimized settings for the image based on the determined proximity for each of the plurality of viewers and the stored preferences of the plurality of viewers; and
adjusting the rendering of the image on the display by changing a frame rate for displaying the image based on the determined optimized settings.

16. The method of claim 1, wherein determining the optimized settings for the image comprises:
applying an anti-aliasing image processing technique.

* * * * *